US012759478B2

(12) United States Patent
Dreyer et al.

(10) Patent No.: US 12,759,478 B2
(45) Date of Patent: Oct. 13, 2026

(54) VEHICLE INTERIOR TRIM PART, METHOD FOR MANUFACTURING THE TRIM PART AND VEHICLE COMPRISING THE INTERIOR TRIM PART

(71) Applicant: MOTHERSON INNOVATIONS COMPANY LIMITED, London (GB)

(72) Inventors: Xavier Dreyer, Strasbourg (FR); Yann Buchet, Strasbourg (FR)

(73) Assignee: Motherson Innovations Company Limited, London (GB)

( * ) Notice: Subject to any disclaimer, the term of this patent is extended or adjusted under 35 U.S.C. 154(b) by 646 days.

(21) Appl. No.: 18/127,288

(22) Filed: Mar. 28, 2023

(65) Prior Publication Data

US 2023/0311785 A1 Oct. 5, 2023

(30) Foreign Application Priority Data

Mar. 29, 2022 (EP) .................................... 22164889

(51) Int. Cl.
*B60R 13/02* (2006.01)
*B32B 7/12* (2006.01)
*B32B 37/12* (2006.01)

(52) U.S. Cl.
CPC ................ *B60R 13/02* (2013.01); *B32B 7/12* (2013.01); *B32B 37/1284* (2013.01); (Continued)

(58) Field of Classification Search
CPC ........................ B60R 2013/0287; B60R 13/02
See application file for complete search history.

(56) References Cited

U.S. PATENT DOCUMENTS 5,448,028 A * 9/1995 Filion .................... B60N 2/797 200/52 R
6,448,028 B1 9/2002 Squires et al.
(Continued)

FOREIGN PATENT DOCUMENTS

AT 6269 U1 * 7/2003 ............. B60R 13/02
DE 10 2018 131 978 A1 6/2020
(Continued)

OTHER PUBLICATIONS

Machine Translation of FR2937932A1 (Year: 2025).*
(Continued)

*Primary Examiner* — Jason S Morrow
(74) *Attorney, Agent, or Firm* — Ursula B. Day, Esq.

(57) ABSTRACT

An interior trim part of a vehicle includes a carrier with a first surface, a second surface, and at least one opening penetrating the carrier from the first surface to the second surface, a membrane layer applied to the first surface and covering the opening, a décor layer applied to the membrane layer, an electronic module arranged within the opening and detachably contacting the membrane layer, and a vibration generating element either integrated into the electronic module or interacting with the electronic module such that vibrations generated by the vibration generating element are transferred to the membrane layer and the décor layer. A vehicle comprising such an interior trim part and a method for manufacturing such an interior trim part are also part of the invention.

15 Claims, 4 Drawing Sheets

(52) U.S. Cl.
CPC . *B32B 2307/7376* (2023.05); *B32B 2605/003* (2013.01); *B60R 2013/0287* (2013.01)

(56) References Cited

U.S. PATENT DOCUMENTS

| | | | | |
|---|---|---|---|---|
| 7,651,145 | B2 * | 1/2010 | Prokop | E05B 83/30 296/37.12 |
| 9,557,857 | B2 * | 1/2017 | Schediwy | G06F 3/016 |
| 9,767,942 | B2 * | 9/2017 | Oeuvrard | B60K 35/10 |
| 10,486,407 | B2 * | 11/2019 | De Wilde | B32B 37/1284 |
| 10,974,662 | B2 * | 4/2021 | Seegers | B60Q 3/745 |
| 2012/0105333 | A1 * | 5/2012 | Maschmeyer | G06F 3/016 345/173 |
| 2023/0185379 | A1 * | 6/2023 | Musy | B32B 27/36 340/425.5 |

FOREIGN PATENT DOCUMENTS

| | | | | |
|---|---|---|---|---|
| EP | 3048015 | A1 | 7/2016 | |
| FR | 2937928 | A1 * | 5/2010 | B60Q 3/54 |
| FR | 2937932 | A1 | 5/2010 | |
| WO | WO 2020/144016 | A1 | 7/2020 | |
| WO | WO-2021180624 | A1 * | 9/2021 | B60K 35/25 |

OTHER PUBLICATIONS

Translation of FR2937928A1.*
Tranlation of AT6269U1 (Year: 2025).*
Translation of AT6269U1 (Year: 2025).*
Translation of FR2937928A1 (Year: 2025).*
European Search Report issued by the European Patent Office in 22 164889.2 issued on Sep. 7, 2022.

* cited by examiner

VEHICLE INTERIOR TRIM PART, METHOD FOR MANUFACTURING THE TRIM PART AND VEHICLE COMPRISING THE INTERIOR TRIM PART

CROSS-REFERENCES TO RELATED APPLICATIONS

This application claims the priority of European Patent Application Serial No. 22 164889.2, filed Mar. 29, 2022 pursuant to 35 U.S.C. 119(a)-(d), the subject matter of which is incorporated herein by reference.

BACKGROUND OF THE INVENTION

The present disclosure relates to an interior trim part of a vehicle, a vehicle comprising such an interior trim part and a method for manufacturing such an interior trim part.

In modern vehicles the number of available vehicle-related functions is constantly increasing. Such functions may relate to the activation of a window lifter, the interior illumination, the air condition or a sound system. Next to the activation of these functions, many comprise parameters that may be set. In case of air conditioning such parameters are for the temperature of the air inside the vehicle to be regulated, or the intensity of the fans that circulate the air. In case of a sound system, settable parameters may relate to volume and acoustics.

In many cases the activation and the setting is done by means of specific buttons. However, the more functions to be set, the higher the number of buttons needed. With increasing number of buttons the more difficult it gets for the driver or a passenger of the vehicle to identify the correct button related to the desired function.

To address the increasing number of buttons, in some vehicles the many functions are accessible via a central button by which a menu illustrated by displays are activated and the desired function selected and parameters set. Although the number of buttons can thereby be reduced, it may still be difficult for the driver or the passenger to find the desired function. In particular, regarding frequently used functions their selection by using said central button and a menu is cumbersome.

In recent approaches, the surface of interior trim parts is included into the activation and setting of vehicle-related functions. For this purpose electronic modules are arranged behind the visible surfaces of interior trim parts which can be activated by touching the visible surface. The interior trim part thereby gets the additional function of a human-machine-interface. As the driver or the passenger may not note whether or not he has triggered the function the electronic modules are equipped with active haptic feedback devices such as vibration generating elements that are activated when the function is correctly triggered. The vibration is transmitted to the visible surface such that the driver or the passenger can perceive the vibration and thus gets active haptic feedback confirming the correct activation of a given function.

Such interior trim parts usually comprise a carrier having a first surface and a second surface and a décor layer applied to the first surface of the carrier. The décor layer forms the visible surface. The electronic module is fastened to the second surface. Vibrations applied to the second surface have to penetrate the carrier to be perceivable by the driver or the passenger. However, due to the attenuation by the carder the intensity of the haptic feedback may significantly be decreased, thereby deteriorating the operating comfort.

Reference is made to WO 2020/144016 A1 and US 2012/0105333 A1 which disclose surfaces with active haptic feedback.

In many cases, the electronic modules comprise capacitive foils with sensors that are firmly bonded to the second surface of the carrier. However, it is not possible to disassemble the electronic module separately form the remaining interior trim part. If an electronic module needs to be replaced, the entire interior trim part needs to be exchanged which is expensive and cumbersome.

DE 10 2018 131 978 A1 shows an interior trim part of a vehicle in which the electronic module is mounted inside an opening of the carrier penetrating the same from the first surface to the second surface. The electronic module can more or less directly interact with the décor layer such that the attenuation by the carrier is almost eliminated. Thus, the intensity of the haptic feedback remains comparatively high.

However, due to the movement of the décor layer induced by the vibrations, the edges of the openings may become visible on the visible side of the décor layer over time. Beyond that, the section of the décor layer covering the opening may bend leading to an unpleasant appearance of the visible side of the interior trim part.

It would therefore be desirable and advantageous to provide an improved trim part in order to obviate prior art shortcomings and to provide a manner to produce the trim part.

SUMMARY OF THE INVENTION

It is one task of one embodiment of the present disclosure to present an interior trim part by which the drawbacks as mentioned above can be eliminated or at least reduced. In particular, it is one task to provide an interior trim part which provides an intense haptic feedback together with a long lasting defect-free appearance of the visible side. Moreover, an embodiment of the present disclosure has the object to provide a vehicle comprising such an interior trim part and a method for manufacturing such an interior trim part.

The task is solved by the features specified in the independent claims. Advantageous embodiments are the subject of the dependent claims.

According to one embodiment of the present disclosure the interior trim part of a vehicle comprises

- a carrier having
  - a first surface,
  - a second surface, and
  - at least one opening penetrating the carrier from the first surface to the second surface,
- a membrane layer applied to the first surface and covering the opening,
- a décor layer applied to the membrane layer, and an electronic module detachably arranged within the opening and contacting the membrane layer or interacting with the membrane layer.

According to the present disclosure, the décor layer is connected to the membrane layer in an uninterruptible way such that the formation of the defects initially described can be avoided and the visible side of the décor layer maintains a decent appearance over a long time. Moreover, it is not necessary to firmly bond the electronic module to the membrane layer. As a consequence, the disassembly and replacement of the electronic module is possible without compromising the surface quality of the décor layer.

In another embodiment, the carrier is molded on the membrane layer or vice versa. The production of the interior trim part can be kept simple and fast. At the same time a long-lasting connection between the membrane layer and the carrier is established. The carrier is made of a thermoplastic material. It is also possible to use a thermoplastic material to form the membrane layer. However, the material of the membrane layer can be freely chosen as long as a proper connection between the carrier and the membrane layer can be established.

In a further embodiment, the membrane layer is fastened to the first surface of the carrier by a first adhesive layer. The use of a first adhesive increases the freedom of choice of the material from which the membrane layer is formed. It is noted that the use of the first adhesive layer is not needed in case the carrier is molded on the membrane or vice versa.

According to another embodiment, the décor layer is applied to the membrane layer by a second adhesive layer. As long as a proper connection between the membrane layer and the décor layer can be established, the material from which the décor layer is formed may be freely chosen. However, the freedom of choice is increased by the use of the second adhesive layer. The décor layer may be made of leather, artificial leather, imitation wood or a textile.

In a further embodiment, the membrane layer has a thickness of between 0, 05 mm and 4 mm. On one hand, membrane layers of such a range of thickness can be produced and mounted without further efforts. On the other hand, the attenuation of the vibrations is kept low. The thicknesses are chosen according to the material used for the membrane layer.

According to another embodiment the décor layer has a thickness of between 0, 2 and 4 mm. The bigger the thickness of the décor layer the bigger the attenuation of the vibrations. It has turned out that a décor layer of in this thickness range leads to a decent appearance without an unacceptably high attenuation. The thickness of the membrane layer and the décor layer are coordinated to provide a decent haptic feedback.

In a further embodiment, the electronic module is fastened to the carrier by a screw- or snapping connection. In this embodiment the electronic module can be mounted in a fairly simple way, but also disassembled in case it needs to be replaced. The electronic module can be removed from the interior trim part and be replaced by another one without the need to remove and/or replace the remaining interior trim part, thereby significantly facilitating the replacement of the electronic module.

In accordance with another embodiment, at least one vibration generating element is either integrated into the electronic module or interacting with the electronic module, such that vibrations generated by the vibration generating element are transferred to the membrane layer and the décor layer. The thickness and the material of the membrane layer are chosen such that the vibrations are not, or almost not attenuated by the membrane layer. Thus, the membrane layer does not negatively affect the haptic feedback of the interior trim part. It is furthermore possible to use a vibration generating element that can be moved between a retracted position and an extended position. In the extended position an elevation is generated which is perceivable by a user who touches the décor layer in the area of the opening. Thus, an alternative or cumulative way to generate active haptic feedback can be provided.

According to another embodiment, the electronic module is decoupled from the carrier by dampening elements. The use of dampening elements ensures that the vibrations are focused in the area of the opening, thereby providing a locally restricted and precise feedback. Also, in case no vibration generating element is used, the decoupling of the electronic module from the carrier helps to reduce the stress acting on the carrier element. In some cases, the vibration generating element is integrated into the electronic module. The decoupling is directly done inside the electronic module such that no additional measures to ensure the decoupling have to be taken.

In a further embodiment, a housing is fastened to the carrier, wherein the housing is enclosing the electronic module. The housing protects the electronic module from exterior influences, thereby ensuring the functionality of the electronic module. Moreover, the housing may act as a support for the vibration generating element.

Another aspect of the present disclosure is directed to a vehicle, comprising an interior trim part according to one of the embodiments previously discussed. The technical effects and advantages as discussed with regard to the present interior trim part equally apply to the vehicle.

Briefly, the electronic module is removable and replaceable without damaging or replacing the remaining trim part. An attenuation of the vibrations generated by the vibration generating element is reduced or even avoided. At the same time the formation of surface defects of the visible side of the décor layer in the area of the opening is avoided.

Another aspect of the present disclosure is directed to a method for manufacturing an interior trim part according to one of the embodiments previously discussed, comprising the following steps:

- providing the membrane layer,
- producing the carrier by
- over molding the membrane layer such that the membrane layer and the carrier are fastened to each other or
- injection molding the carrier followed by the steps of applying a first adhesive layer to the first surface and fastening the membrane layer to the carrier.

The technical effects and advantages as discussed with regard to the present interior trim part equally apply to the vehicle. Briefly, an attenuation of the vibrations generated by the vibration generating element is reduced or even avoided. At the same time, the formation of surface defects of the visible side of the décor layer in the area of the opening is avoided. At the same time, the membrane layer and the carrier can be connected to each other in a fast and simple way.

According to another embodiment the method comprises the following steps:

- placing a lamination tool such that it is contacting the second surface and the membrane layer,
- laminating the décor layer on the membrane layer.

Due to the fact that the lamination tool contacts the membrane layer, it acts as a support for the membrane layer during the lamination process. The use of the lamination tool allows the application of a comparatively high pressure when laminating the décor layer on the membrane layer without the risk to bend or even damage the membrane layer.

A further embodiment step of laminating the décor layer on the membrane layer comprises the step of applying a second adhesive layer on the membrane layer. As long as a proper connection between the membrane layer and the décor layer can be established, the material the décor layer is formed of may be freely chosen. However, the freedom of choice is increased by the use of the second adhesive layer. The décor layer may be made of leather, artificial leather, imitation wood or a textile.

In a further embodiment the method comprises the following step:

- fastening the electronic module to the carrier by a screw- or snapping connection.

In this embodiment, the electronic module can be mounted in a fairly simple way but also disassembled in case it needs to be replaced. The electronic module can be removed from the interior trim part and be replaced by another one without the need to remove or damage the remaining interior trim part.

In a further embodiment the method comprises the following step:

fastening a housing to the carrier such that the housing is enclosing the electronic module.

The housing protects the electronic module from exterior influences, thereby ensuring the functionality of the electronic module.

BRIEF DESCRIPTION OF THE DRAWINGS

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
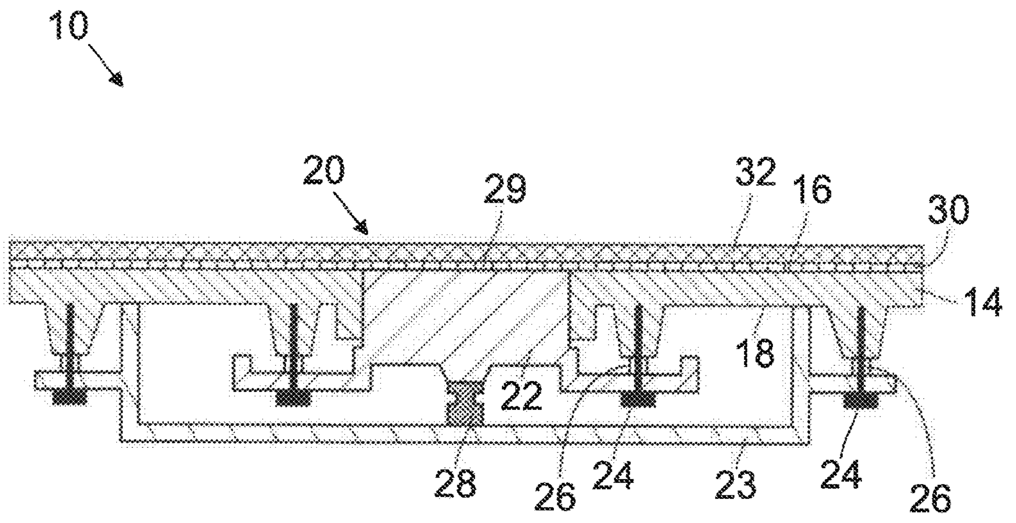
FIG. 1 shows an interior trim part according to the cited prior art.

Throughout all the Figures, same or corresponding elements are generally indicated by same reference numerals.

Turning now to the drawing, and in particular to FIG. 1, there is shown an interior trim part 10 for or of a vehicle 12 (see FIG. 4) according to the state of the art, resembling the interior trim part 10 disclosed in DE 10 2018 131 978 A1, is illustrated by means of a principle drawing.

The interior trim part 10 comprises a carrier 14 with a first surface 16 and a second surface 18. Moreover, an opening 20 is penetrating the carrier 14 from the first surface 16 to the second surface 18. An electronic module 22 is arranged within the opening 20 which is fastened to the carrier 14 via the second surface 18 by means of a screw connection 24. Moreover, a housing 23 is fastened to the carrier 14, also by means of a screw connection 24. Both the electronic module 22 and the housing 23 are fastened to the carrier 14 with dampening elements 26 arranged between the second surface 18 and the electronic module 22 or the housing 23, respectively.

The electronic module 22 is interacting with a vibration generating element 28, which upon activation is generating vibrations. The vibration generating element 28 is located between the housing 23 and the electronic module 22. However, it is also possible that the vibration generating element 28 is Integrated into the electronic module 22.

The electronic module 22 is arranged inside the opening 20 such that its top surface 29 is more or less flush with the first surface 16 of the carrier 14. A gluing layer 30 is applied to the first surface 16 and the top surface 29. A décor layer 32 is applied to the first surface 16 and the top surface 29 by means of the gluing layer 30. This means that the electronic module 22 is fastened to the décor layer 32.

A user, in particular a driver or a passenger of the vehicle 12, may trigger a function provided or activated by the electronic module 22 by pressing the décor layer 32 in the area of the opening 20 with his fingers. To identify this area the décor layer 32 may be illuminated and/or may comprise a marking. Depending on the design of the electronic module 22 the user may only have to touch the décor layer 32 within the area of the opening 20 or has to apply a certain pressure within this area for activating the electronic module 22. The vibration generating element 28, for example embodied as an exciter or activator, is triggered once the electronic module 22 is activated. The vibrations are transmitted to the décor layer 32 and thus perceptible by the user, thereby providing a haptic feedback.

However, due to the movement of the décor layer 32 induced by the vibrations the edges of the opening 20 may become visible with the time. Due to height tolerances an offset may form between the carrier 14 and the first surface 29 of the electronic module 22 leading to a gap in the connection to the décor layer 32. This gap will become visible with the time.

Beyond that the section of the décor layer 32 covering the opening 20 may bend leading to an unpleasant appearance of the visible side of the interior trim part 10.

As mentioned, the electronic module 22 is fastened to the décor layer 32 by means of the gluing layer 30. As a consequence the electronic module 22 cannot be removed in case of failure or update without damaging the décor layer 32. In the worst case the entire interior trim part 10 has to be changed.

Figure 2:
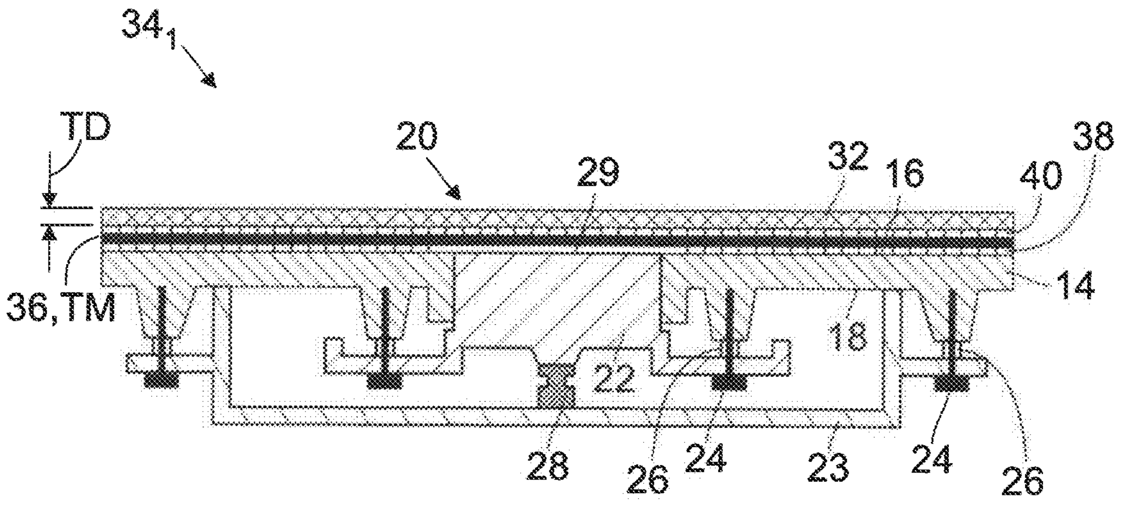
FIG. 2 shows a first embodiment of an interior trim part of the present invention.

In FIG. 2 a first embodiment of the inventive interior trim part $\mathbf{34}_1$ is demonstrated by means of a principle drawing. The basic design of the inventive interior trim part $\mathbf{34}_1$ is the same as described for the interior trim part $\mathbf{34}_1$ according to the prior art. Thus, only the key differences are described in the following.

In the first embodiment of the inventive interior trim part $\mathbf{34}_1$ a membrane layer 36 is applied to the first surface 16 of the carrier 14. The membrane layer 36 is also covering the opening 20. The membrane layer 36 is fastened on the first surface 16 by means of a first adhesive layer 38, however, other ways of fastening the membrane layer 36 to the carrier 14 are possible, e.g. by over molding the carrier 14 to the membrane layer 36.

The first adhesive layer 38, however, is only applied to the first surface 16 of the carrier 14, but not inside the opening 20. In other words, there is no permanent connection between the electronic module 22 and the membrane layer 36. However, the membrane layer 36 and the electronic module 22 are arranged relative to each other such that they can interact with each other regarding the transmission of vibrations generated by the vibration generating element 28.

A second adhesive layer 40 is applied on the membrane layer 36 to fasten the décor layer 32 on the membrane layer 36. When the user touches the décor layer 32 within the area of the opening 20 and activates the electronic module 22 the vibrations generated by the vibration generating element 28 are transferred from the electronic module 22 to the membrane layer 36 and further to the décor layer 32. For this purpose the top surface 29 of the electronic module 22 may touch the membrane layer 36 or only a small gap is formed between the top surface 29 and the membrane layer 36.

The membrane layer 36 has a thickness TM of between 0.05 mm and 4 mm. The décor layer 32 has a thickness TD of between 0.2 mm and 4 mm.

The membrane layer 36 avoids that the vibrations make the edges of the openings 20 visible on the visible side of the décor layer 32. Further, the membrane layer 36 compensates gaps in the connection to the décor layer 32 caused by size tolerances of the electronic module 22 relative to the carrier 14. Moreover, as there is no permanent connection between the electronic module 22 and the membrane layer 36, the electronic module 22 can be replaced without damaging the interior trim part $34_1$. In case the electronic module 22 needs to be replaced, there is no need to replace the interior trim part $34_1$ as well.

Figure 3A:
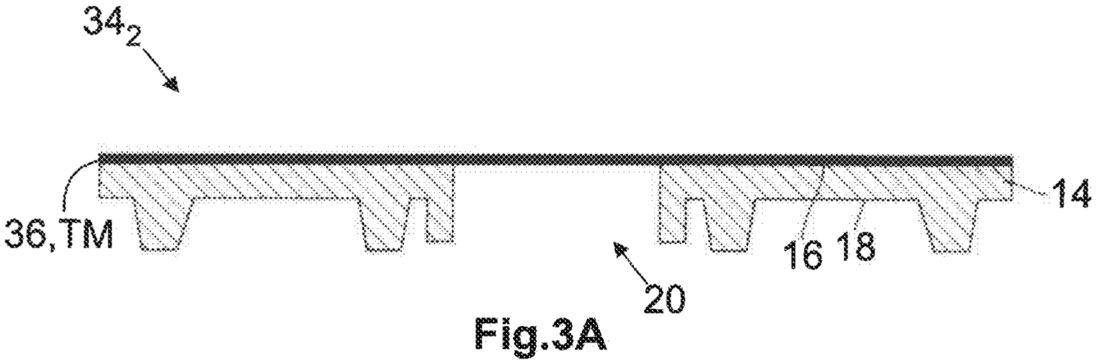
FIGS. 3A to 3E shows different steps of a method for manufacturing a second embodiment of the interior trim part of the present invention.

FIGS. 3A to 3E show the most important steps of a method for producing a second embodiment of the interior trim part $34_2$. First of all the membrane layer 36 is provided and then the carrier 14 is molded over the membrane layer 36 (FIG. 3A). Depending on the material of the membrane layer 36 there is no need to use glue or other fastening means to connect the membrane layer 36 and the carrier 14 with each other. Therefore and in contrast to the first embodiment of the interior trim part $34_1$, the interior trim part $34_2$ according to the second embodiment does not comprise the first adhesive layer 38.

Figure 3B:
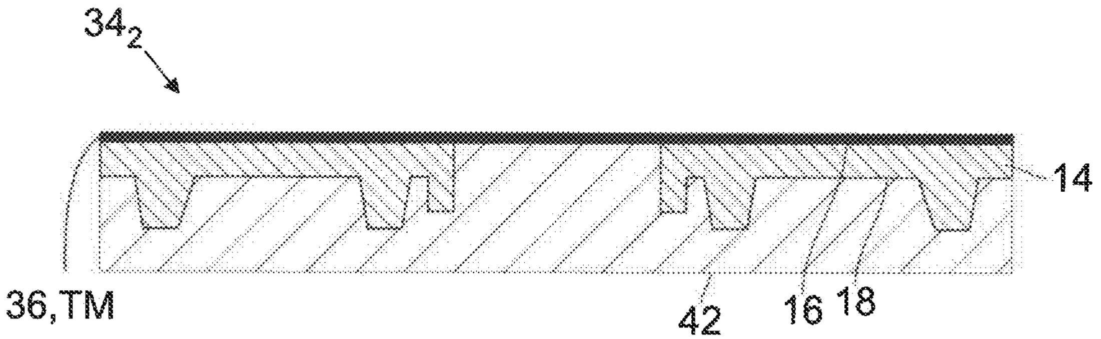
Figure 3C:
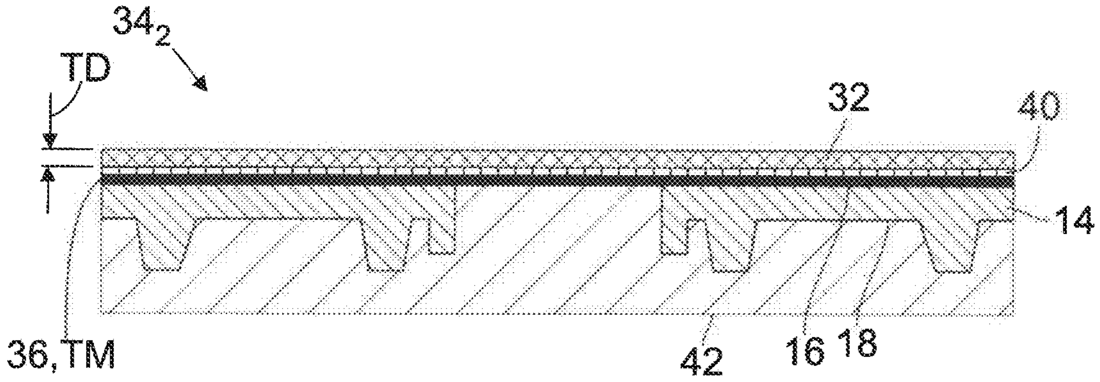
Figure 3D:
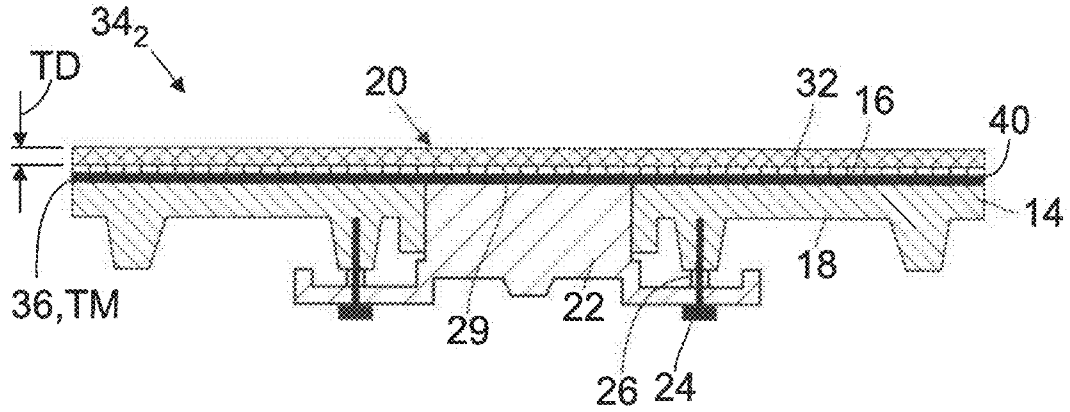
Figure 3E:
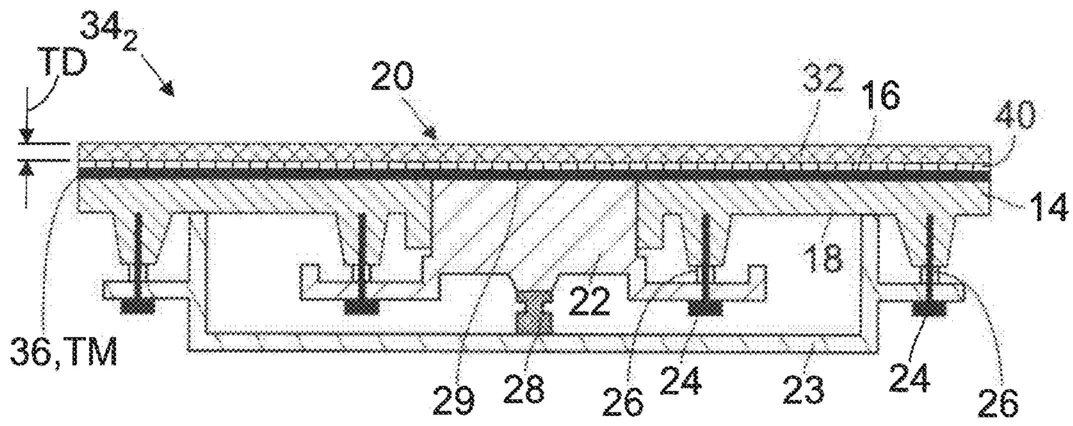

As evident from FIG. 3B a lamination tool 42 is arranged such that it contacts the second surface 18 of the carrier 14 and the membrane layer 36. After that the second adhesive layer 40 is applied to the membrane layer 36 and the décor layer 32 is fastened to the membrane layer 36 and thus to the carrier 14. The lamination tool 42 ensures that the required pressure can be applied across the entire décor layer 32 including the area of the opening 20.

After that the lamination tool 42 is removed and the electronic module 22 is fastened to the carrier 14, in this case by a screw connection 24. It is noted that dampening elements 26 are arranged between the electronic module 22 and the second surface 18 of the carrier 14. In case the dampening elements 26 are integrated into the electronic module 22 it is not necessary to provide the dampening elements 26 as shown.

In the last step the housing 23 is mounted to the carrier 14. As in the case of the electronic module 22, also in the case of the housing 23 dampening elements 26 are placed within the fastening sections of the electronic module 22 and the carrier 14. With the housing 23 the vibration generating element 28 is mounted. The housing 23 acts as a support for the vibration generating element 28.

The dampening elements 26 decouple the electronic module 22 and the housing 23 from the carrier 14 with respect to the transmission of the vibrations. The majority of the vibrations are transmitted to the décor layer 32 via the top surface 29 of the electronic component.

Figure 4A:
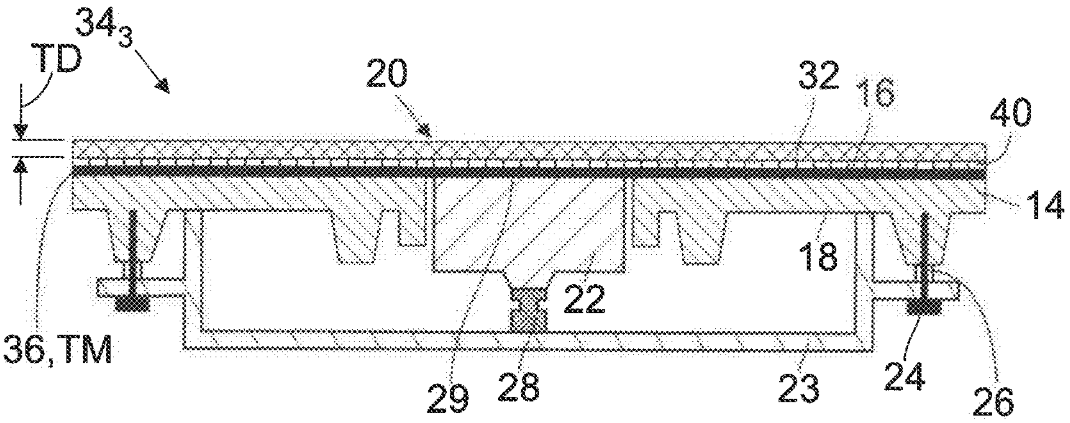
FIGS. 4A and 4B shows a third embodiment of the interior trim part according to the present disclosure in two different states.
Figure 4B:
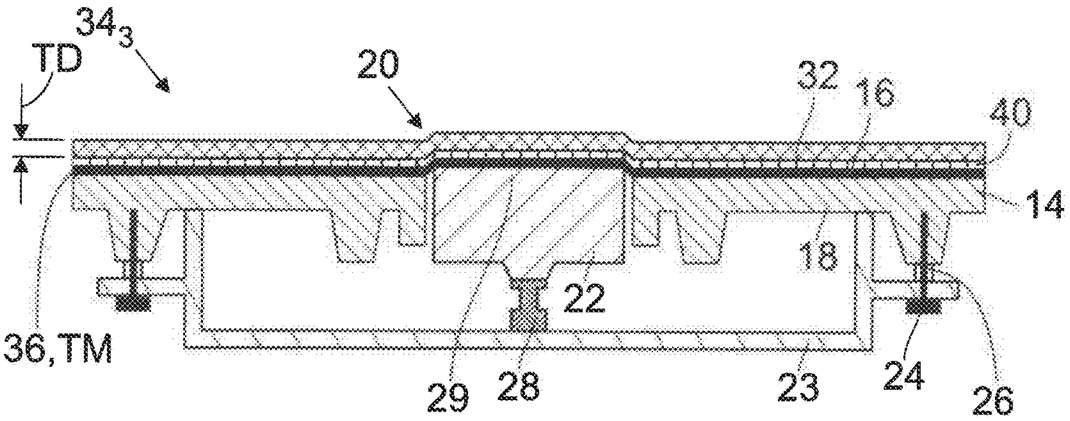

In FIGS. 4A and 4B a third embodiment of the interior trim part $34_3$. The constitution of the interior trim part $34_3$ of the third embodiment is to a large extent identical to the interior trim part $34_2$ of the second embodiment. Therefore, only the essential differences are addressed below. In contrast to the first and second embodiment of the trim part $34_1$, $34_2$, in the third embodiment of the trim part $34_3$ the electronic module 22 is not fastened to the carrier 14 but supported on the vibration generating element 28. Further, the electronic module 22 is in contact with the membrane layer 36. Due to this arrangement the use of dampening elements 26 can be avoided. The vibration generating element 28 is designed not only to create vibrations but also to be moved between a retracted position (see FIG. 4A) and an expanded position (FIG. 4B). In an embodiment not shown two separate actuation devices may be provided. One actuation device may be used for the generation of vibrations and one actuation device for moving the electronic module 22 between the retracted position and the expanded position. Beyond that, it may be possible to provide several vibration generating elements 28, e.g., one vibration generating element 28 for generating vibrations in the retracted position and one in the expanded position. For enhancing the haptic feedback one may also employ a plurality of vibration generating elements 28.

It is also possible to dispense with the creation of vibrations and only expand and retract the vibration generating element 28.

In the expanded position the membrane layer 36, the second adhesive layer 40 and the décor layer 32 are deformed such that an elevation is generated in the area of the opening 20. This elevation is just big enough to be perceptible by the user who touches the décor layer 32 in the area of the opening 20. The material the membrane layer 36, the second adhesive layer 40 and the décor layer 32 are made of is chosen to be flexible enough to allow a reversible deformation such that the decor layer 32 returns in a flat state once the vibration generating element 28 is moved in its retracted position (FIG. 4A). This reversible deformation is also referred to as "morphing".

Figure 5:
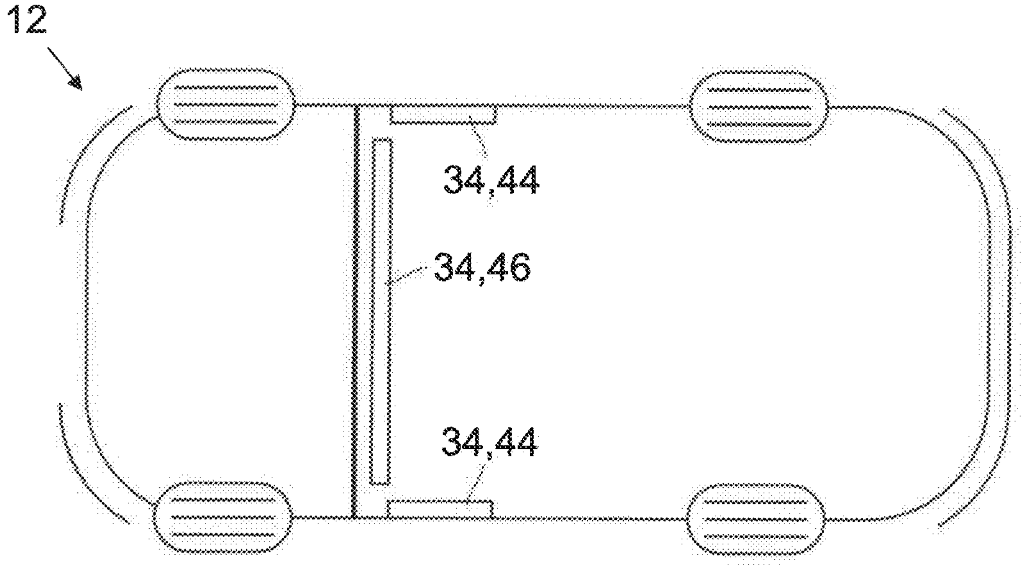
FIG. 5 shows a vehicle comprising at least one trim part according to the present invention, all of the Figures being principle sketches.

FIG. 5 shows principle top view of a vehicle 12 which comprises a number of interior trim parts 34 according to the present invention. Arm rests 44 and instrument panels 46 are named as non-exhaustive examples of such interior trim parts 34.

While the invention has been illustrated and described as embodied in a vehicle trim part, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

What is claimed is:

1. An interior trim part of a vehicle, comprising a carrier having a first surface, a second surface, and at least one opening penetrating the carrier from the first surface to the second surface, a membrane layer applied to the first surface and covering the opening, a décor layer applied to the membrane layer, and an electronic module detachably arranged within the opening and contacting the membrane layer or Interacting with the membrane layer, wherein the electronic module is decoupled from the carrier by dampening elements, and the dampening elements are configured to decouple the electronic module from the carrier with respect to transmission of vibrations to the carrier.

2. The interior trim part according to claim 1, wherein the carrier is molded on the membrane layer or vice versa.

3. The interior trim part according to claim 1, wherein the membrane layer is fastened to the first surface of the carrier by a first adhesive layer.

4. The interior trim part according to claim 3, wherein the décor layer is applied to the membrane layer by a second adhesive layer.

5. The interior trim part according to claim 1, wherein the membrane layer has a thickness of between 0.05 mm and 4 mm.

6. The interior trim part according to claim 1, wherein the décor layer has a thickness (TD) of between 0.2 mm and 4 mm.

7. The interior trim part according to claim 1, wherein the electronic module is fastened to the carrier by a screw- or snapping connection.

8. The interior trim part according to claim 1, wherein at least one vibration generating element is either integrated into the electronic module or interacting with the electronic module such that vibrations generated by the vibration generating element are transferred to the membrane layer and the décor layer.

9. The interior trim part according to claim 1, wherein a housing is fastened to the carrier, said housing is enclosing the electronic module.

10. A vehicle, comprising an interior trim part according to claim 1.

11. A method for manufacturing an interior trim part according to claim 1, comprising the following steps:

producing the carrier by over molding the membrane layer such that the membrane layer and the carrier are fastened to each other or injection molding the carrier followed by the steps of applying a first adhesive layer to the first surface and fastening the membrane layer to the carrier.

12. The method according to claim 11, comprising the following steps:

placing a lamination tool such that it is contacting the second surface and the membrane layer, laminating the décor layer on the membrane layer.

13. The method according to claim 12, wherein the step of laminating the décor layer on the membrane layer comprises the step of applying a second adhesive layer on the membrane.

14. The method according to claim 11, comprising the following step:

fastening the electronic module to the carrier by a screw- or snapping connection.

15. The method according to claim 11, comprising the following step:

fastening a housing to the carrier such that the housing is enclosing the electronic module.

* * * * *